United States Patent [19]
Dilliplane et al.

[11] Patent Number: 6,097,400
[45] Date of Patent: Aug. 1, 2000

[54] METHOD AND APPARATUS FOR ANTI-ALIASING POST RENDERING OF AN IMAGE

[75] Inventors: Steven C. Dilliplane, Yardley; Michael Frank, Newtown, both of Pa.

[73] Assignee: ATI Technologies, Inc., Thornhill, Canada

[21] Appl. No.: 09/087,712

[22] Filed: Jun. 1, 1998

[51] Int. Cl.[7] .................................................. G06F 15/00
[52] U.S. Cl. ............................................................ 345/443
[58] Field of Search ..................................... 345/443, 442, 345/441, 419, 421, 422, 112, 113, 114

[56] References Cited

U.S. PATENT DOCUMENTS

| | | | |
|---|---|---|---|
| 5,649,080 | 7/1997 | Minakata | 345/443 |
| 5,815,162 | 9/1998 | Levine | 345/443 |
| 5,977,979 | 11/1999 | Clough et al. | 345/422 |
| 5,977,980 | 11/1999 | Aleksicy | 345/422 |

*Primary Examiner*—Phu K. Nguyen
*Attorney, Agent, or Firm*—Markison & Reckamp, P.C.

[57] ABSTRACT

A method and apparatus for anti-aliasing a rendered scene begins processing by rendering a plurality of objects of an image to a buffer to produce a rendered image. For example, the image corresponds to a particular frame of data to be displayed on a computer monitor, television, etc. Each of the objects corresponds to portions of the image and is comprised of object-elements (e.g., triangles). While the plurality of objects is being rendered, edge information of the objects that are in a most foreground position is maintained. The edge information includes a pixel offset value, which indicates the offset of an edge from a pixel center, and gradient information of the object edge. After the image has been rendered and the edge information has been collected for a particular frame of data, the rendered image is filtered based on the edge information. In particular, a two-dimensional spatial filter that derives its filtering parameters from the edge information is applied to the rendered image.

19 Claims, 3 Drawing Sheets

METHOD AND APPARATUS FOR ANTI-ALIASING POST RENDERING OF AN IMAGE

TECHNICAL FIELD OF THE INVENTION

The present invention relates generally to video graphics processing and more particularly to anti-aliasing.

BACKGROUND OF THE INVENTION

As is known, video graphic circuits are utilized in computers to process images for subsequent display on a display device, which may be a computer monitor, a television, a LCD panel, and/or any other device that displays pixel information. Typically, the central processing unit of a computer generates data regarding the images to be rendered and provides the data to the video graphics circuit. The video graphics circuit, upon receiving the data, processes it to generate pixels representing triangles (i.e., the basic rendering elements of an image). As the video graphics circuit is generating the pixel data, it utilizes a frame buffer to store the pixels. When the video graphics circuit has processed a frame of data, the frame buffer is full and is subsequently read such that the pixel data is provided to the display device. As is also known, the frame buffer is of sufficient size to store a frame of data, which directly corresponds to the physical size of the display device. For example, a 640×480 display device requires a frame buffer that includes 640×480 memory locations, each of sufficient size to store pixel data.

Since the display device is of a fixed size, the physical size of a pixel is also fixed. In addition, a pixel can only display a single pixel of data. As such, an object's edge may appear jagged due the physical size of the pixel and the single pixel of data. The visual perception of the jagged edges of an object depends on the resolution of the display device. The higher the resolution, the less perceivable the jagged edges. For example, a display device having a resolution of 1,024× 800 will have less perceivable jagged edges than a display having a resolution of 640×480.

While increasing the resolution of the display device works to reduce the perceivable jagged edges, the ability to increase the resolution is not available for many display devices. When increasing the resolution is not a viable option, or further reduction in the perceivability of jagged edges is desired, anti-aliasing may be utilized. There are a variety of anti-aliasing methods including over-sampling, fragment buffers, and sort dependent anti-aliasing. In general, the over-sampling method renders a scene at various locations (each offset from the other by a fraction of a pixel). Each of the rendered scenes is stored in a frame buffer. As one would expect, the frame buffer is much larger than a frame buffer used in a video graphics circuit without oversampling anti-aliasing. For example, if the oversampling rate is four, the frame buffer must be four times that of the frame buffer used in a non-anti-aliasing system. Once the various sampled images are stored in the frame buffer, they are filtered, where the filtered scene is stored in a destination frame buffer. Thus, while this method produces the desired results (i.e., reduced jagged edges), it requires a substantial amount of extra memory.

The fragment buffer buffering anti-aliasing technique utilizes a data structure that is kept outside/adjacent to the rendered surface. The data structure contains information about specific pixels of an object that need to be anti-aliased (e.g., pixels along the edge of the object). The data structure for these pixels include information regarding Z values, coverage masks, and multiple pixel color values of the pixels of the object and the adjacent object. When the object has been rendered, the specific pixels are further processed based on the information stored in the fragment buffers to build the final anti-aliasing image.

As is known, the fragment buffer technique may be implemented in a variety of degrees of complexity, producing varying degrees of accuracy. In a fairly complex implementation, the accuracy of the fragment buffer technique is comparable to the over sampling method, but has the advantage that, on average, it requires much less memory to implement. The disadvantages, however, include that there is no upper bound on the size of the fragment buffers, thus they must be sized to handle worst case situations, which, on the average, adds a significant amount of memory. In addition, a dedicated block is required to process the fragment buffers, which adds circuit complexity and increases the size and cost of associated hardware.

The sort dependent anti-aliasing technique renders a three-dimensional object in a pre-determined order based on the Z value of the objects (i.e., the perceived distance from the front of the display). As such, the objects are rendered from the back most (farthest away) pixels to the front most (closest), or vice-versa. As the images are rendered, in this sort dependent order, the edges are smoothed together by blending the pixels on the edges with the pixels of the other objects directly behind it, or in front of it. If this process is done correctly, it is more cost effective, in terms of hardware, than the other techniques and is capable of producing high quality anti-aliasing. This method, however, requires complex three-dimensional objects that intersect other objects to be subdivided into multiple objects that do not intersect with any other object. Such intersecting is done in software, which slows the overall rendering process and consumes more of the central processing unit's time.

Therefore, a need exists for a cost efficient quality anti-aliasing method and apparatus that, at least, overcomes the disadvantages of oversampling, fragment buffers and sort dependent anti-aliasing.

DETAILED DESCRIPTION OF A PREFERRED EMBODIMENT

Generally, the present invention provides a method and apparatus for anti-aliasing a rendered scene. Such processing begins by rendering a plurality of objects of an image to a buffer to produce a rendered image. For example, the image corresponds to a particular frame of data to be displayed on a computer monitor, television, etc. Each of the objects corresponds to portions of the image and is comprised of object-elements (e.g., triangles). While the plurality of objects is being rendered, edge information of the objects that are in a most foreground position is maintained. The edge information includes a pixel offset value, which indicates the offset of an edge from a pixel center, and gradient information of the object edge. After the image has been rendered and the edge information has been collected for a particular frame of data, the rendered image is filtered based on the edge information. In particular, a two-dimensional spatial filter that derives its filtering parameters from the edge information is applied to the rendered image. With such a method and apparatus, anti-aliasing of an image may be done by filtering a completely rendered image based on edge information. Such edge information is generated during the normal rendering process. As such, little additional computational overhead and little additional memory are needed to provide anti-aliasing.

Figure 1:
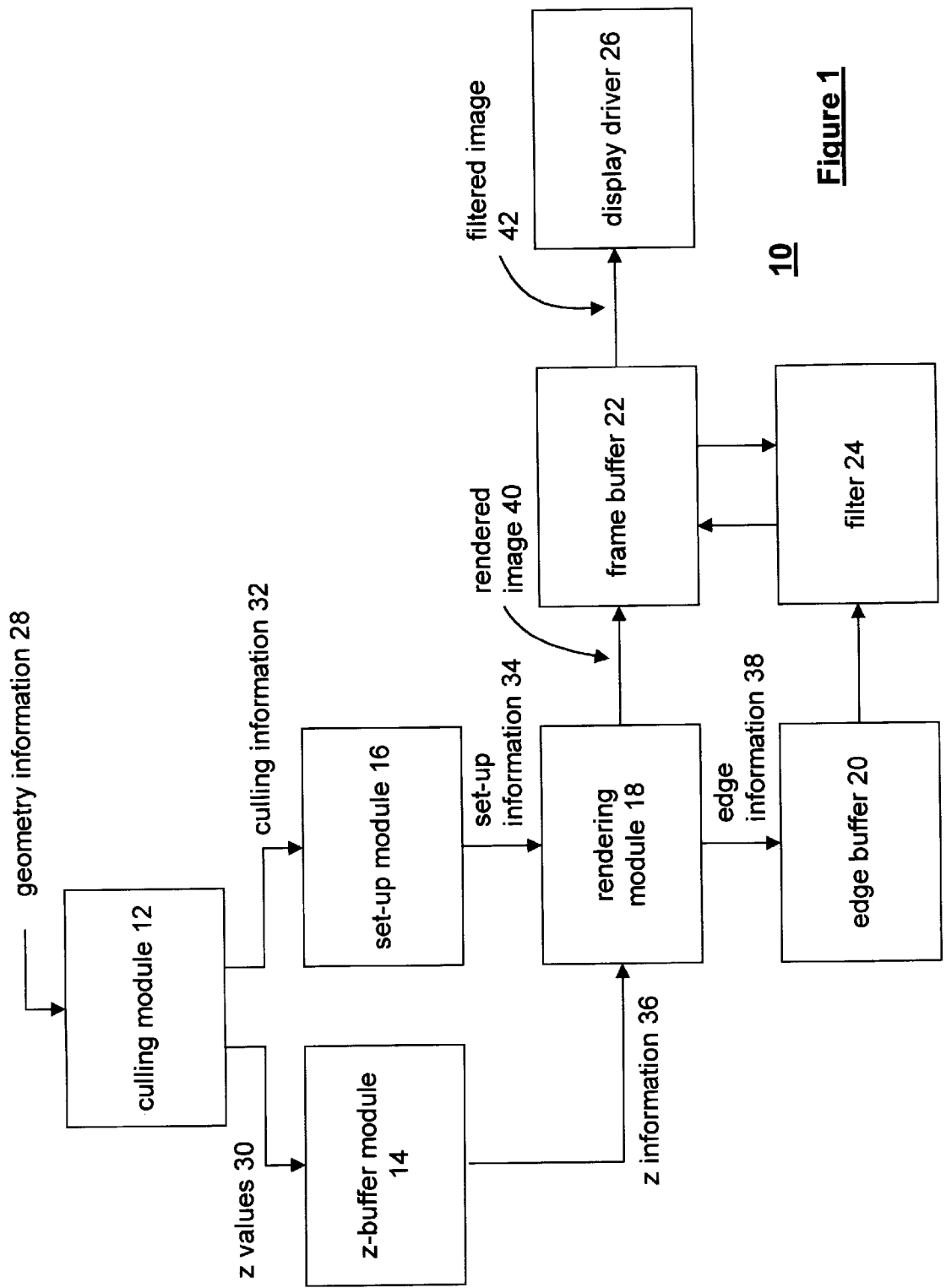
FIG. 1 illustrates a schematic block diagram of a video processor in accordance with the present invention.

The present invention can be more fully described with reference to FIGS. 1 through 4. FIG. 1 illustrates a video processor 10 that includes a culling module 12, a Z buffer module 14, a setup module 16, a rendering module 18, an edge buffer 20, a filter 24, a frame buffer 22, and a display driver 26. The culling module 12, the Z buffer module 14, the setup module 16 and the rendering module 18 may be implemented as software modules, hardware modules and/or a combination thereof. For example, modules 12–18 may be implemented in a similar manner as corresponding modules in ATI Technologies Rage Pro, Rage 128, etc. products.

In general, the culling module 12 is operably coupled to receive geometry information 28 (e.g., shape, size, color, etc.) of an image to be rendered. In addition, the culling module 12 may be operably coupled to receive specific filtering parameters that will be subsequently provided to filter 24. If the culling module 12 receives the filtering parameters, they will be passed to the edge buffer 20. When the rendered image 40 is completely stored in frame buffer 22, the filtering parameters will be retrieved from the edge buffer 20 and utilized to filter the rendered image 40.

The culling module 12 produces culling information 32 and Z values 30 from the geometry information 28. The Z values 30 are provided to the Z buffer module 14 while the culling information 32 is provided to the setup module 16. The Z values 30 indicate the mathematical depth of an object with respect to the three-dimensional coordinate system of the display. Z values typically range from 0 to 1, where a Z value of a 0 is in the most foreground position and a Z value of a 1 is in the most background position. The Z buffer module 14 maintains the Z values of the objects which are in the most foreground position. As such, once a complete image has been processed, which equates to a frame of video data, the Z buffer module 14 will include the Z values for each object that is in a most foreground position. Such Z information 36 is provided to the rendering module 18.

The setup module 16 is operably coupled to receive the culling information 32, which indicates the objects that are front facing and/or back facing. For example, front facing objects are visible with respect to the viewer while back facing objects are not. The setup module 16 processes the culling information 32 along with object parameters to produce setup information 74. The render module 18 receives the setup information 34 and the Z information 36. Based on these inputs, the rendering module 18 generates a rendered image 40. In addition, the rendering module 18 utilizes the setup information 34 and the Z information 36 to produce edge information 38. The edge information includes pixel offset values for each edge of an object in the most foreground position along with the gradient of edges of the objects in the most foreground position. Such information is typically produced during the normal rendering process but discarded once a pixel has been rendered. By providing such information to an edge buffer 20, a frame's worth of edge information may be maintained with minimal additional computational overhead and additional memory.

The frame buffer 22 is operably coupled to receive the rendered image 40. Note that the frame buffer may be a dual buffer consisting of a front buffer and a back buffer. In the dual buffer configuration, the front buffer is operably coupled to the display driver 26 to provide filtered images 42 thereto, while the back buffer is used to store the currently rendered image. When the currently rendered image is completed, the front and back buffers flip designations such that the currently rendered image is provided to display driver 26.

Filter 24 is operably coupled to the frame buffer 22 and the edge buffer 20. The filter 24 is a two-dimensional spatial filter that determines its filtering parameters based on the edge buffer 20, which is applied to the rendered image 40 after it has been stored in the frame buffer 22. The filter 24 may filter the rendered image 40 during a page flip, when the data is transferred to the display driver 26, or at any time subsequent to the rendered image 40 being stored in the frame buffer 22. As one of average skill in the art would appreciate, the edge buffer 20 may store other parameters, that are known and/or generated by the rendering module 18 during the normal rendering process but are typically not saved. Such parameters would include attributes of the pixel, texture information, motion vectors (which would be used to blur an image), depth of field and other geometric information.

Figure 2:
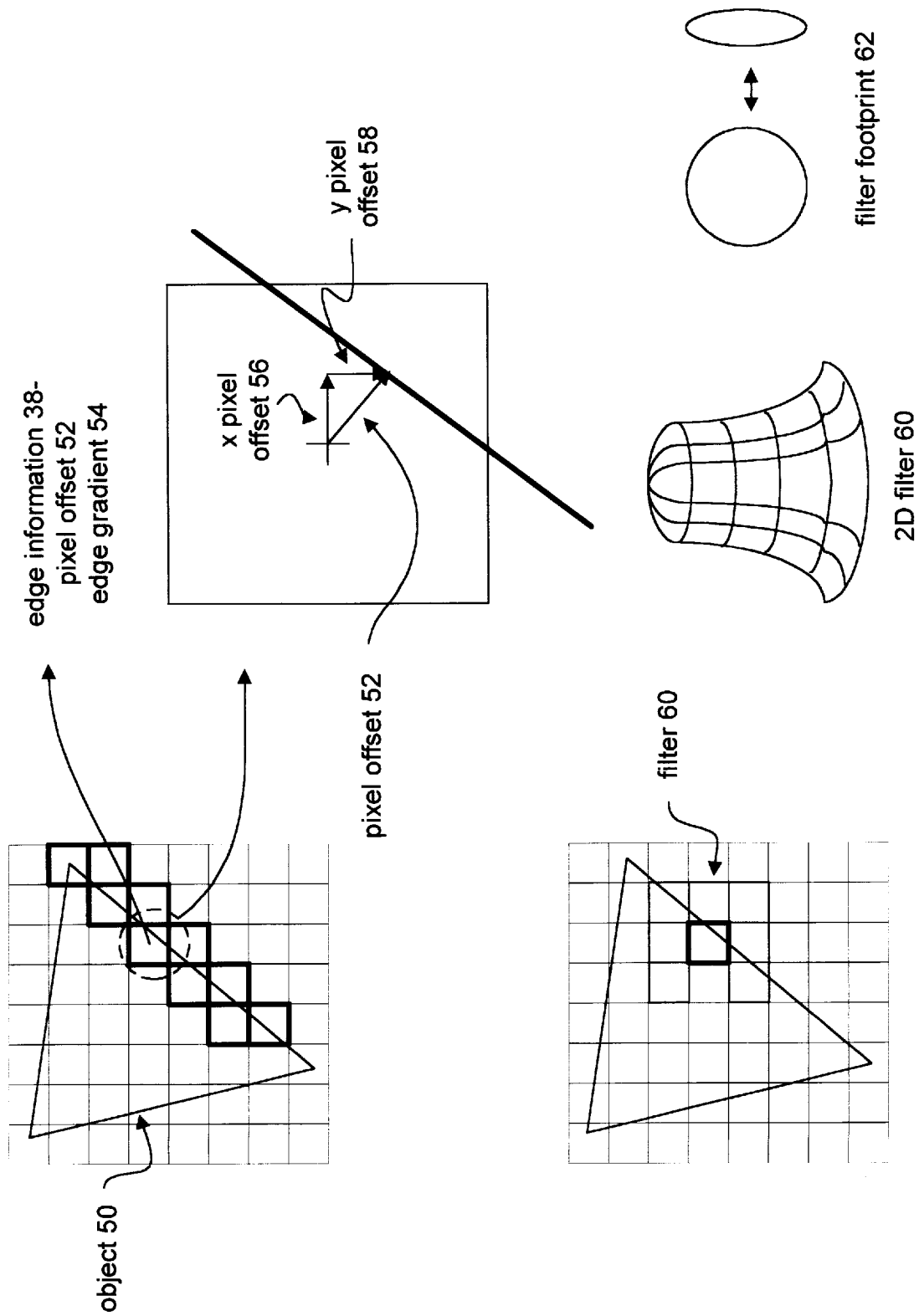
FIG. 2 illustrates a graphical representation of the anti-aliasing process of the present invention.

FIG. 2 illustrates a graphical representation of the anti-aliasing process performed by the video processor 10. The video processor 10 renders an object 50 based on given spatial coordinates of the object 50. For each pixel along an edge of the object, pixel offset values 52 and an edge gradient 54 are determined for the edge. The gradient 54 may be readily determined based on the vertex parameters of the object provided to the setup module 16. The pixel offset value 52, and the edge gradient 54 are stored in the edge buffer 20. As shown, the pixel offset value 52 may include a single value that is a perpendicular vector corresponding to the center of a pixel to the edge, or may contain an X pixel offset 56 and a Y pixel offset 58. In general, the pixel offset 52 corresponds to distance from the center of the pixel with respect to the major axis of the edge (the x-axis when the slope is 0 to +/−45 degrees, the y-axis when the slope of the edge is +/−45 to +/−90 degrees).

Once the image has been rendered (i.e., a full frame of data has been rendered), each edge of an object may be filtered by filter 60. The filter 60 includes a kernel of pixels, which may be in an M pixel by N pixel format. Each pixel within the kernel has a weighting factor to provide filtering footprint 62. The values of N and M and the weighting of the pixels are based on the edge information. In addition, the filtering parameters (i.e., N, M, and weighting factors) may be based on the contrast between the objects. As such, substantial differences in contrast between objects will have a narrower filter, i.e., a smaller footprint 62, and when the contrast is similar between objects the footprint 62 will be larger. As is further shown, the filter 60 may have a two-dimensional filter shape. The shape of the filter, the magnitude, and the footprint 62 of the filter are determined based on the edge parameters and/or the contrast between objects.

Figure 3:
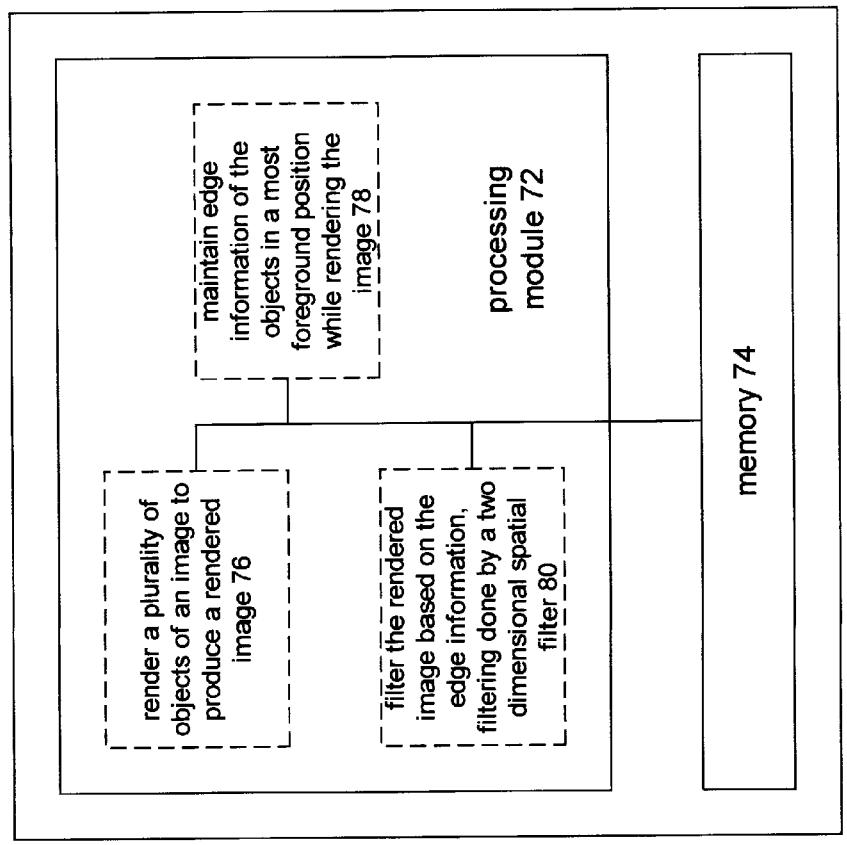
FIG. 3 illustrates a schematic block diagram of another video graphics processor in accordance with the present invention.

FIG. 3 illustrates a schematic block diagram of a video processor 70 that includes a processing module 72 and memory 74. The processing module 72 may be a microprocessor, microcontroller, microcomputer, digital signal processor, central processing unit, and/or any device that manipulates digital information based on programming instructions. The memory 74 may be read-only memory, random access memory, floppy disk memory, hard disk memory, CD memory, DVD memory, magnetic tape memory, and/or any device that stores digital information.

The memory 74 stores programming instructions, that, when read by the processing module 72, causes the processing module 72 to function as a plurality of circuits 76–80. While reading the programming instructions, the processing module 72 functions as circuit 76 to render a plurality of objects of an image to produce a rendered image. Such a rendered image corresponds to a frame of data. The processing module then functions as circuit 78 to maintain edge information of the objects that are in a most foreground position while rendering the image. The processing module then functions as circuit 80 to filter the rendered image based on the edge information. The filtering may be done by a two-dimensional spatial filter. The programming instructions stored in memory 74 and the execution thereof by processing module 72 will be discussed in greater detail with reference to FIG. 4.

Figure 4:
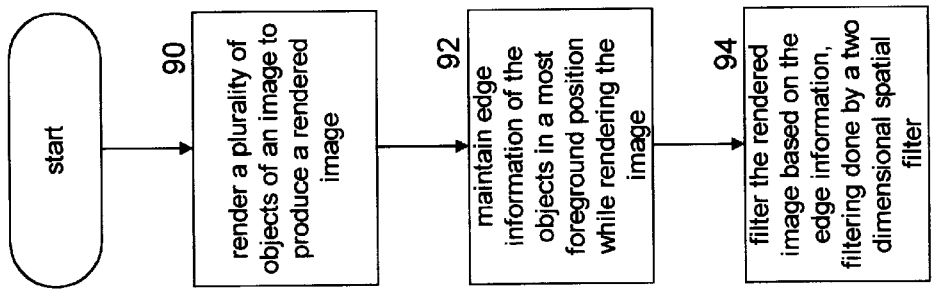
FIG. 4 illustrates a logic diagram of a method for anti-aliasing in accordance with the present invention.

FIG. 4 illustrates a logic diagram of a method for anti-aliasing a rendered image. The process begins at step 90 where a plurality of objects of an image is rendered to produce a rendered image. The process then proceeds to step 92 where edge information is maintained for the objects that are in a most foreground position while rendering the image. The edge information includes at least one of pixel offset values for pixels along the edges of the plurality of objects and gradient information regarding the edges of the plurality of objects. Such information is readily obtainable during the normal rendering process.

The process then proceeds to step 94 where the rendered image is filtered based on the edge information. The filtering may be done by a two-dimensional spatial filter that is adaptively adjustable based on the edge information. The filter will be positioned based on the pixel offset values and will be adjusted based on the gradient information. In addition, the filtering parameters may be adjusted based on local contrast (i.e., the contrast between adjacent objects). Such filtering may be done as the rendered image is transferred from the buffer to the display or during a page flip of the buffer.

The above discussion has presented a method and apparatus for anti-aliasing an image after it has been rendered. The characteristics of the filter are determined based on edge information, which are accumulated during the normal rendering process. As such, anti-aliasing can be performed by filtering post-rendered images with minimal computational and/or memory overhead.

What is claimed is:

1. A method for anti-aliasing an image, the method comprises the steps of:
   a) rendering a plurality of objects of the images to a buffer to produce a rendered image;
   b) while rendering the plurality of objects, maintaining edge information of objects of the plurality of objects in a most foreground position; and
   c) filtering the rendered image based on the edge information, wherein the filtering is done by applying a two-dimensional spatial filter.

2. The method of claim 1, wherein the edge information includes at least one of: pixel offset values for pixels along edges of the plurality of objects and gradient information regarding the edges of the plurality of objects.

3. The method of claim 2, wherein step (c) further comprises adaptively adjusting the filtering based on the edge information.

4. The method of claim 3 further comprises positioning a center of the two-dimensional filter based on the pixel offset values.

5. The method of claim 3 further comprises spatially adjusting the two-dimensional filter based on the gradient information.

6. The method of claim 1 further comprises adjusting the two-dimensional filter based on local contrast.

7. The method of claim 1, wherein step (c) further comprises filtering the rendered image as the rendered image is transferred from the buffer to a display.

8. The method of claim 1, wherein step (c) further comprises filtering the rendered image during a page flip of the buffer.

9. A video processor that includes anti-aliasing comprises:
   a set-up module operably coupled to receive object parameters for objects that are to be rendered, wherein the set-up module produces set-up information based on the object parameters;
   a z-module operably coupled to receive z information of the objects, wherein the z-module determines which of the objects are in a most foreground position;
   a rendering module operably coupled to the set-up module and the z-module, wherein the rendering module produces pixel data based on the set-up information for the objects that are in the most foreground position, wherein the rendering module provides the pixel data to a frame buffer, wherein the rendering module generates edge information for the objects that are in the most foreground position based on the set-up information; and
   a filter operably coupled to the rendering module, wherein the filter retrieves pixel data from the frame buffer and filters the pixel data based on the edge information.

10. The video processor of claim 9 further comprises an edge buffer operably coupled to the rendering module, wherein the edge buffer stores the edge information.

11. The video processor of claim 9, wherein the filter further comprises an adaptively adjustable filter, wherein the adaptively adjustable filter is spatially adjusted based on gradient information of the edges of the objects, wherein the edge information includes pixel offset values and the gradient information.

12. The video processor of claim 11, wherein the adaptively adjustable filter is positioned based on the pixel offset values.

13. A video processor comprises:
   a processing module; and
   memory operably coupled to the processing module, wherein the memory stores programming instructions that, when read by the processing module, cause the processing module to: (a) render a plurality of objects of the images to a buffer to produce a rendered image; (b) maintain edge information of objects in a most foreground position while rendering the plurality of objects; and (c) filter the rendered image based on the edge information, wherein the filtering is done by applying a two-dimensional spatial filter.

14. The video processor of claim 13, wherein the memory further comprises programming instructions that cause the processing module to adaptively adjusting the filter based on the edge information, wherein the edge information includes at least one of: pixel offset values for pixels along edges of the plurality of objects and gradient information regarding the edges of the plurality of objects.

15. The video processor of claim 14, wherein the memory further comprises programming instructions that cause the processing module to position a center of the two-dimensional filter based on the pixel offset values.

16. The video processor of claim 14, wherein the memory further comprises programming instructions that cause the processing module to spatially adjust the two-dimensional filter based on the gradient information.

17. The video processor of claim 13, wherein the memory further comprises programming instructions that cause the processing module to adjusting the two-dimensional filter based on local contrast.

18. The video processor of claim 13, wherein the memory further comprises programming instructions that cause the processing module to filter the rendered image as the rendered image is transferred from the buffer to a display.

19. The video processor of claim 13, wherein the memory further comprises programming instructions that cause the processing module to filter the rendered image during a page flip of the buffer.

* * * * *